(12) United States Patent
Rodi

(10) Patent No.: US 7,597,528 B2
(45) Date of Patent: Oct. 6, 2009

(54) APPARATUS FOR STACKING OBJECTS AND CONVEYING THE OBJECT STACK

(75) Inventor: Wolfgang Rodi, Baustetten (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 429 days.

(21) Appl. No.: 11/130,561

(22) Filed: May 17, 2005

(65) Prior Publication Data

US 2005/0265815 A1 Dec. 1, 2005

(30) Foreign Application Priority Data

Jun. 1, 2004 (DE) ........................ 10 2004 026 612

(51) Int. Cl.
B65H 29/26 (2006.01)
(52) U.S. Cl. ............... 414/790.4; 414/788.9; 414/790.3; 414/793.8; 414/790.6; 414/900; 209/657; 198/419.1; 53/534
(58) Field of Classification Search ................. 198/811, 198/803.5, 703, 714, 458, 431, 418.7, 689.1; 209/651, 657; 414/790.3–790.9, 791.1, 792.8, 414/793.5, 793.6, 794.6, 794.7, 183, 198, 414/192, 222.07, 222.1, 267, 331.08, 332, 414/799, 593, 789.7, 789.9, 793.8, 793.4; 53/531, 258, 251, 534, 540
See application file for complete search history.

(56) References Cited

U.S. PATENT DOCUMENTS

| | | | | |
|---|---|---|---|---|
| 3,107,912 A | * | 10/1963 | Fiehl ........................... | 271/215 |
| 3,139,714 A | * | 7/1964 | Hall ............................. | 53/540 |
| 3,370,549 A | * | 2/1968 | Livingston ................... | 104/212 |
| 3,395,915 A | * | 8/1968 | Clausen et al. .............. | 271/197 |
| 3,583,562 A | * | 6/1971 | Yock et al. ................... | 209/586 |
| 3,633,739 A | | 1/1972 | Renner et al. | |
| 4,314,785 A | * | 2/1982 | LaFleur et al. ........... | 414/790.3 |
| 4,399,905 A | | 8/1983 | Lance et al. ................. | 198/422 |
| 4,738,083 A | | 4/1988 | Kawai et al. ................. | 53/579 |
| 4,905,843 A | * | 3/1990 | Holbert ...................... | 209/571 |
| 5,072,573 A | * | 12/1991 | Tisma ......................... | 53/252 |
| 5,575,612 A | * | 11/1996 | Uno ........................ | 414/788.9 |
| 5,787,680 A | * | 8/1998 | Tisma et al. .................. | 53/244 |

FOREIGN PATENT DOCUMENTS

| | | |
|---|---|---|
| DE | 3728209 | 3/1989 |
| DE | 19935665 | 3/2001 |
| DE | 203 04 880 | 7/2003 |
| EP | 1 155 983 | 11/2001 |
| JP | 2001199575 | 7/2001 |
| JP | 2003072722 | 3/2003 |
| JP | 2003072943 | 3/2003 |
| JP | 2003137431 | 5/2003 |

* cited by examiner

Primary Examiner—Gregory W Adams
(74) Attorney, Agent, or Firm—Andrew Wilford

(57) ABSTRACT

An input device delivers objects one at a time to a transfer station next to a conveyor extending in a transport direction. A cassette defines an upwardly open stack well shaped to receive the objects and has a floor. The cassette is held in an upstream stack-forming position underneath the input device while the input device drops the objects one at a time into the well, and the floor of the cassette is stepped downward each time an object is dropped into the well by a distance generally equal to a vertical height of the object. When a predetermined number of the objects has been dropped into the well, the cassette is displaced downstream out of the upstream stack-forming position synchronously with the conveyor at the transport speed while the stack of objects in the well is pushed transversely of the direction out of the well into the conveyor.

5 Claims, 8 Drawing Sheets

APPARATUS FOR STACKING OBJECTS AND CONVEYING THE OBJECT STACK

FIELD OF THE INVENTION

The present invention relates to an apparatus for stacking objects. More particularly this invention concerns such an apparatus that, after forming the stack, hands it off to a packaging conveyor.

BACKGROUND OF THE INVENTION

Pharmaceutical products are usually packed in blister packages that are made from foils in a thermoforming machine that creates individual blister packs. As a rule a plurality of the blister packs are contained in a single cardboard box so that an apparatus is required that receives the incoming individual objects, here the blister packs, forms them into stacks, and then loads the stacks onto a packaging conveyor. The packages arrive at the stacking/transferring machine at a much higher speed than that at which the stacks of the objects move off on the packaging conveyor.

The problem here is insuring good process safety with a high production rate, since stacking the blister packs is difficult and there are problems when the stack is formed by dropping the objects since the objects must fall through different distances as the stack grows. As the objects drop they can become canted and even slight misalignments can disrupt the production line.

OBJECTS OF THE INVENTION

It is therefore an object of the present invention to provide an improved apparatus for stacking objects and then transferring them to a packaging conveyor or the like.

Another object is the provision of such an improved apparatus for stacking objects and then transferring the stacks to a packaging conveyor or the like that overcomes the above-given disadvantages, in particular that ensures that the stacks will be formed accurately and quickly, and that then the stacks will be handed off to the packaging conveyor without disrupting the stacks.

SUMMARY OF THE INVENTION

An object-handling system has according to the invention an input device that delivers objects one at a time to a transfer station, a conveyor extending in a transport direction past and away from the transfer station and moving in the direction at a generally constant transport speed, and a cassette defining an upwardly open stack well shaped to receive the objects and having a floor. According to the invention the cassette is held in an upstream stack-forming position underneath the input device while the input device drops the objects one at a time into the well, and the floor of the cassette is stepped downward each time an object is dropped into the well by a distance generally equal to a vertical height of the object. When a predetermined number of the objects has been dropped by the input device into the well, the cassette is displaced downstream out of the upstream stack-forming position in the direction synchronously with the conveyor at the transport speed while the stack of objects in the well is pushed transversely of the direction out of the well into the conveyor.

According to the invention the input device delivers the object at a generally uniform rate. The objects are arrested as they arrive from the input device at the stacking station and are generally simultaneously separated from the input device so they drop into the stack well.

Thus the stacking and transferring apparatus has according to the invention a cassette displaceable next to the conveyor in the transport direction from an upstream stacking position and having an upwardly open stack well shaped to receive the objects and having a floor so that, when the cassette is in the upstream stack-forming position underneath the input device, the input device drops the objects one at a time into the well. A lifter lowers the floor of the cassette each time an object is dropped into the well by a distance generally equal to a vertical height of the object. When a predetermined number of the objects has been dropped by the input device into the well, a drive displaces the cassette out of the upstream stack-forming position downstream in the direction synchronously with the conveyor at the transport speed, and a pusher shifts the stack of objects in the well transversely of the direction out of the well into the conveyor when the cassette is moving synchronously with the conveyor and the stack wells are aligned transversely with the cells of the conveyor.

Such an apparatus has the advantage that as is standard the object stack is formed from the bottom up, but always with the same drop distance, since as a result of the lifter the floor of the stack well is suitably positioned. The dropping of the objects from the feeder into the stack shaft is the only time during the entire process that the displacement of the object is not controlled by the machine that is the object is not actually being gripped by something, but due to the short drop distance the object cannot move from the desired orientation. It is further advantageous that as a result of the synchronized movement of the cassette with the package conveyor the transfer is well controlled and the object stack is safely held either by the side walls of the stack well or by the elements of the package conveyor.

According to the invention the conveyor is an endless row of transversely open stack cells into which the stacks of objects are transferred by the pusher means. In addition the cassette forms a row of the stack wells that are spaced apart in the transport direction identically to the cell wells of the conveyor.

More specifically in accordance with the invention the input device includes a suction belt from which the objects are suspended. An abutment arrests the objects as they arrive from the input device at the stacking station, with the objects being gripped by the suction belt but sliding along it when engaged by the abutment. A pusher separates the objects from the suction belt when they are arrested by the abutment so the objects drop into the stack well. The pusher includes a vertically effective knockout tool that pushes the objects down off the suction belt. A sensor at the station detects an object directly above the stack well of the cassette in the upstream stack-forming position. The sensor is connected to or part of a controller that in turn is connected to the actuators and drives for the cassette, its floor, the abutment, the knockout tool, and the stack pusher.

The cassette according to the invention has a pair of generally parallel upright walls spaced apart in the transport direction and both extending generally perpendicular to the transport direction. The walls flank the floor and define the stack well. They are adjustable in the transport direction so that objects of different format can be stacked.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
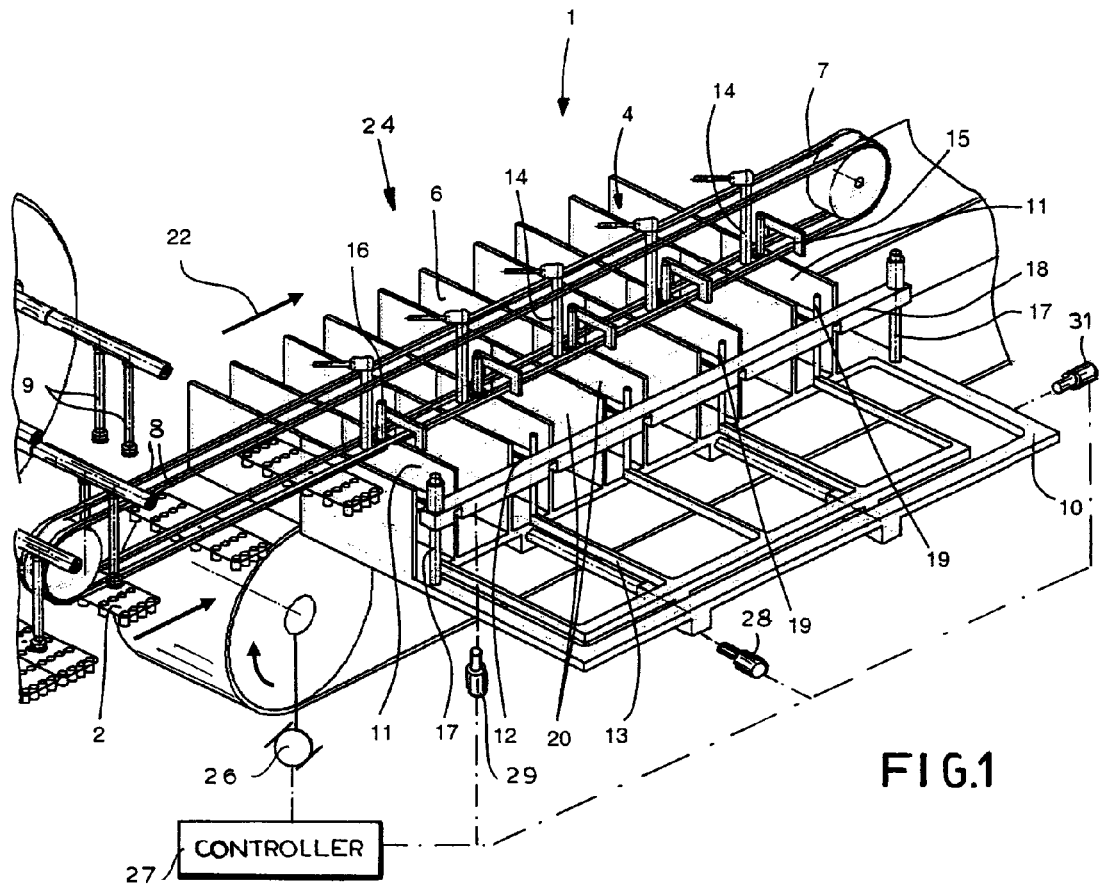
FIG. 1 is a perspective schematic representation of the stacking and transfer apparatus according to the invention.
Figure 2:
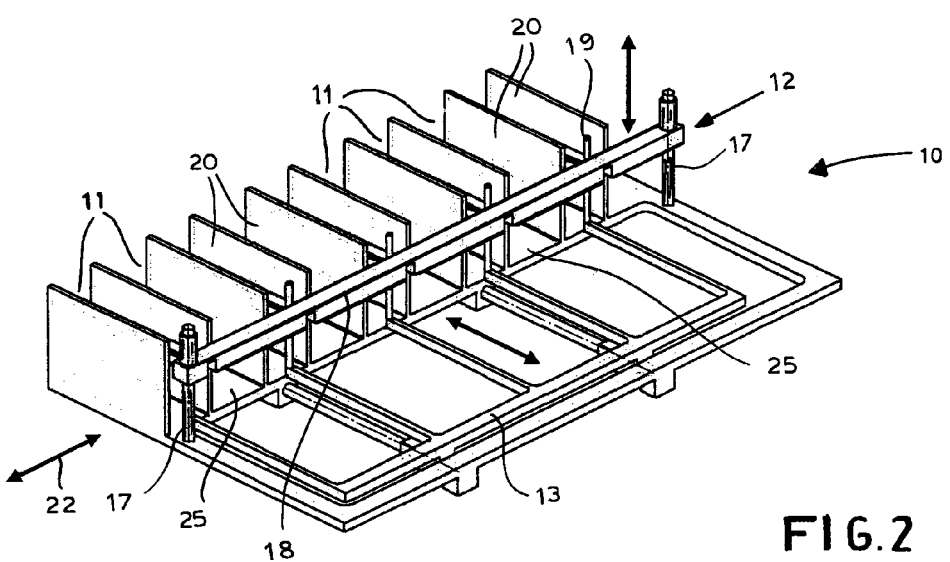
FIG. 2 is a perspective view showing only the cassette.
Figure 3:
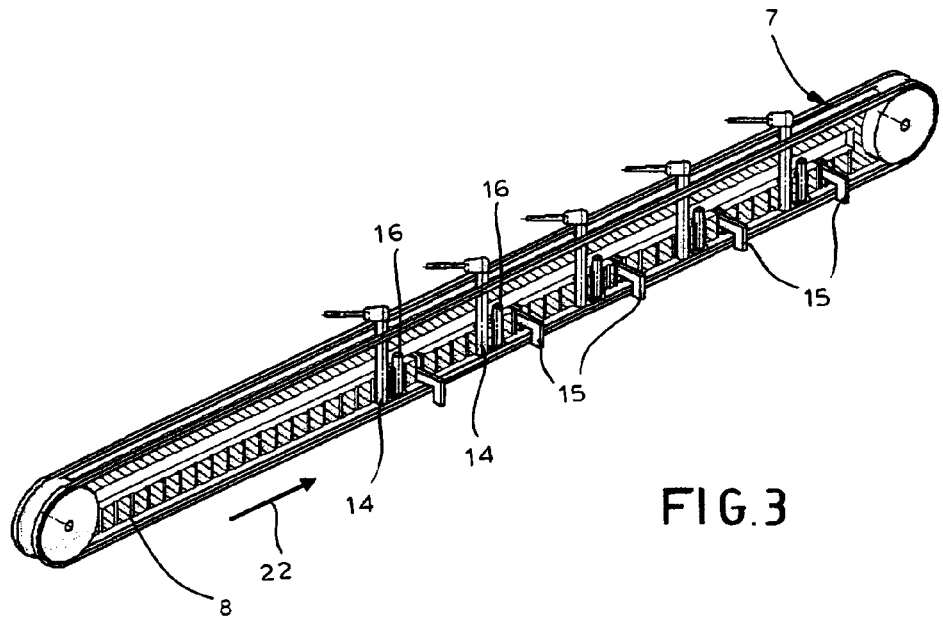
FIG. 3 is a perspective view showing only the input device.
Figure 4:
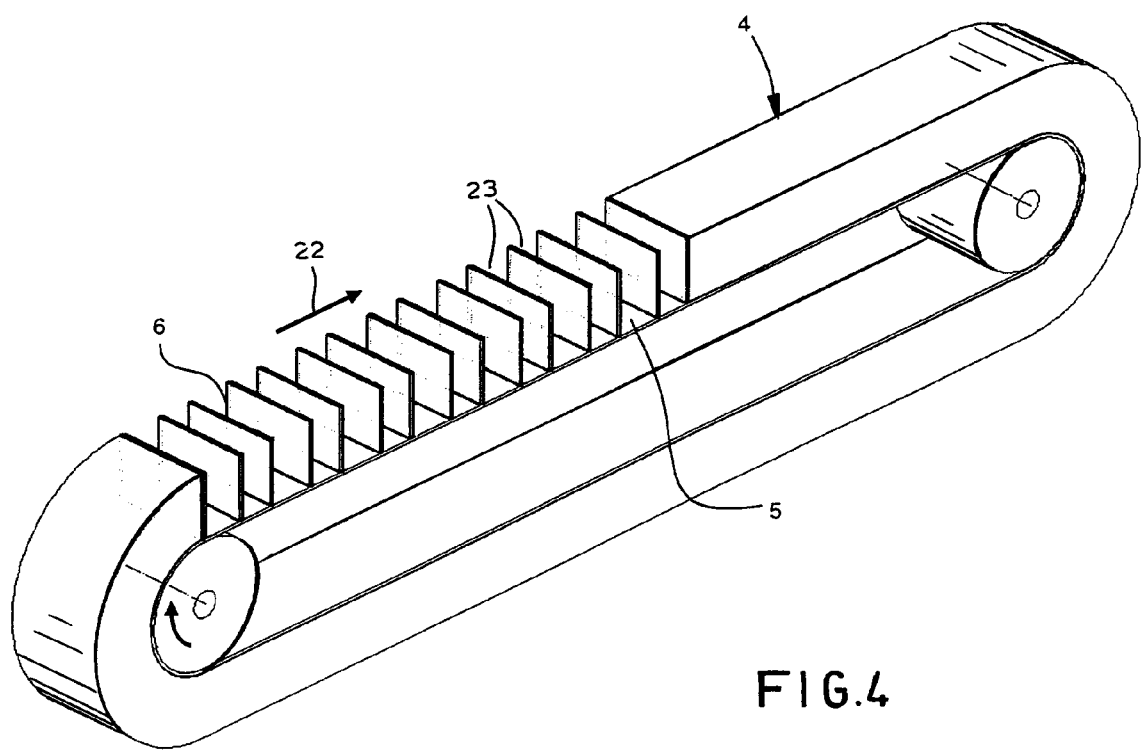
FIG. 4 is a perspective view showing only the package conveyor.
Figure 5:
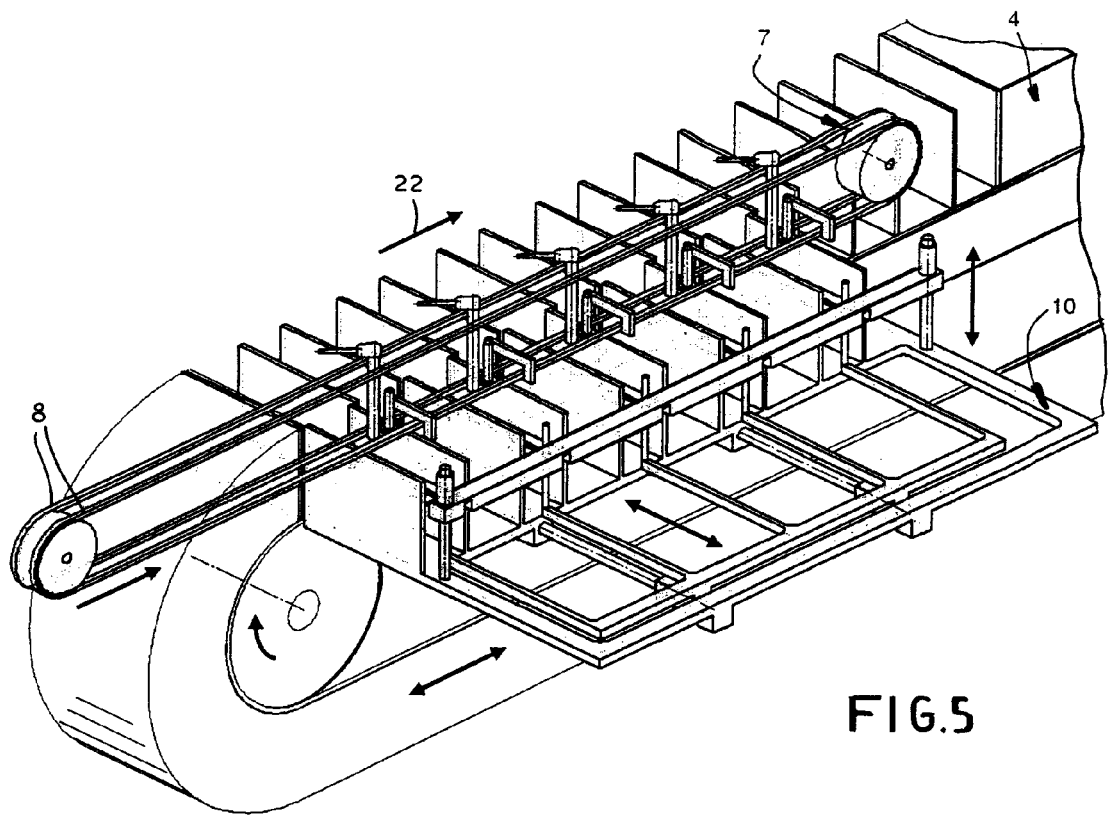
FIG. 5 is a perspective view showing the cassette, the input device, and the package conveyor.

As seen in FIGS. 1 to 4 an apparatus 1 forms objects 2 into stacks 3 and transfers the stacks 3 into a package conveyor 4 that has an endless conveyor belt 5 (FIG. 4) having transverse upright partitions 6 forming an endless row of object cells 23 that are open transversely of a transport direction 22 in which the conveyor 4 is moved by a drive illustrated schematically at 26. The apparatus 1 furthermore has a input device 7 (FIG. 3) that feeds the objects 2 to a transfer station 24 adjacent an upstream end of the conveyor 4, with the objects arriving at the station 24 one at a time at a fairly fast rate. The input device 7 has a pair of spaced suction belts 8 for suspending and transporting the objects 2, which are blister packs. A rotary suction gripper unit 9 delivers the objects 2 to the upstream ends of the lower reaches of the belts 8.

The input device 7 extends laterally along and parallel to the package conveyor 4 above a cassette 10. The cassette 10 has at least one stack well 11, but in the embodiment illustrated in the drawing has a row of five stack wells 11 extending in the direction 22. A lifter 12 sets the level of floors 25 of the stack wells 11 according to the number of the objects 2 stacked in the wells 11. The lifter 12 has two spaced guide pins 17 on which an actuator 29 can vertically shift a lifter bar 18 carrying the floors 25 of the stack wells 11. Another actuator or servo drive 31 connected to a controller 27 like the actuator 29 can displace the entire cassette 10 in the transport direction 22.

The stacks 3 are moved from the stack wells 11 into the conveyor 4 by means of a slide 13 shiftable on the cassette 10 perpendicular to the transport direction 22. This takes place while the cassette 10 is displaced by the drive 31 in the direction 22 synchronously with the conveyor 4. When the cassette 10 is in the stack-forming station 24, a sensor 14 above each stack well 11 can detect the correct positioning of one of the objects 2 relative to the respective stack shaft 11, the sensors 14 being built into the input device 7. The sensors 14 are connected to the processor/controller 27. The input device 7 further has for each stack well 11 a vertically displaceable abutment 15 and a vertically displaceable pusher 16 operated by respective unillustrated actuators in turn operated by the controller 27. The slide 13 has a pusher bar 19 engageable with each object stack 3 and operated by another actuator 28 also connected to the controller 27. The stack wells 1 are each formed by two side walls 20 whose spacing can be adjusted for different formats.

The apparatus 1 described above operates as follows.

The objects are fed by the unit 9 to the input devices 7 which advances them one at a time at a fairly high speed in the direction 22. The floors 25 are set by the actuator 29 at their highest positions, that is spaced below the input device 7 by a spacing equal to only slightly more than the height of one of the objects 2, and the entire cassette 10 is in the station 24 in its extreme upstream stack-forming position.

Figure 6:
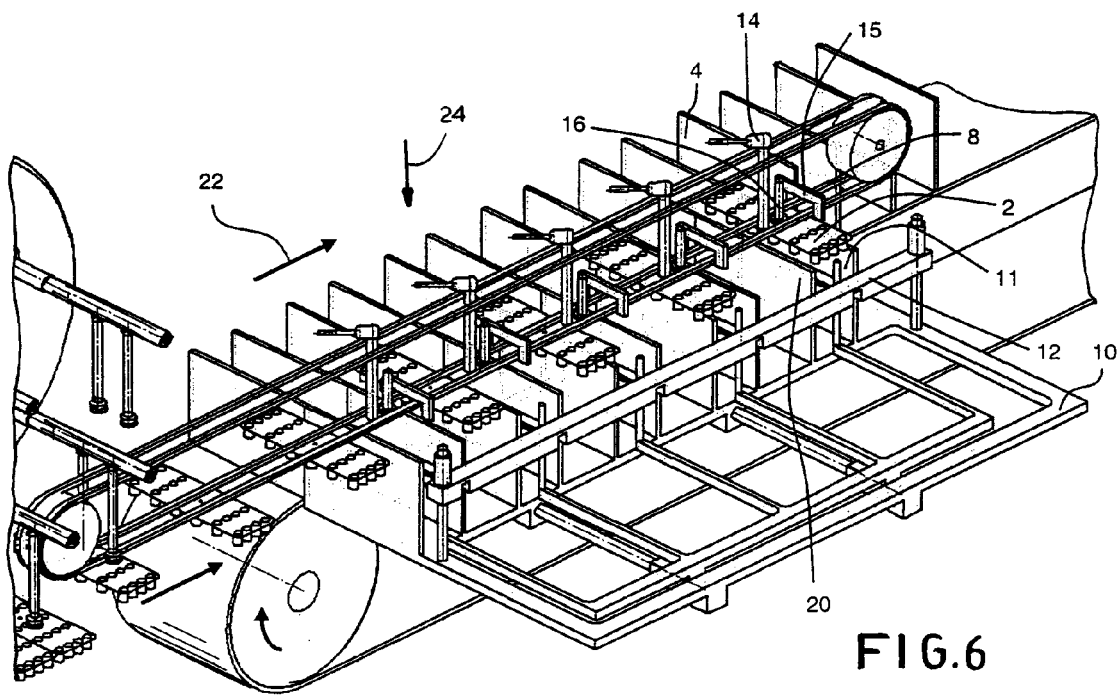
FIG. 6 is a view like FIG. 1 before the start of the formation of the object stack in the first stack well.
Figure 7:
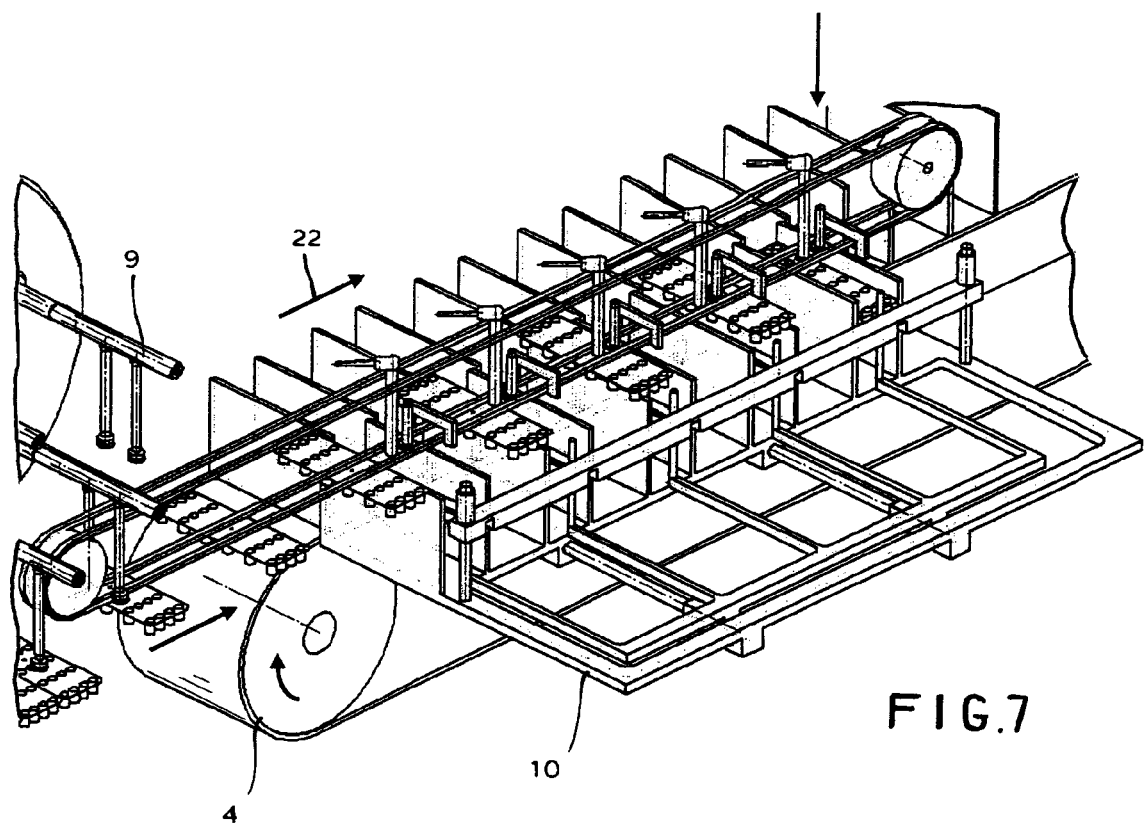
FIG. 7 is a view like FIG. 6 showing dropping of the first object in the first stack well.
Figure 8:
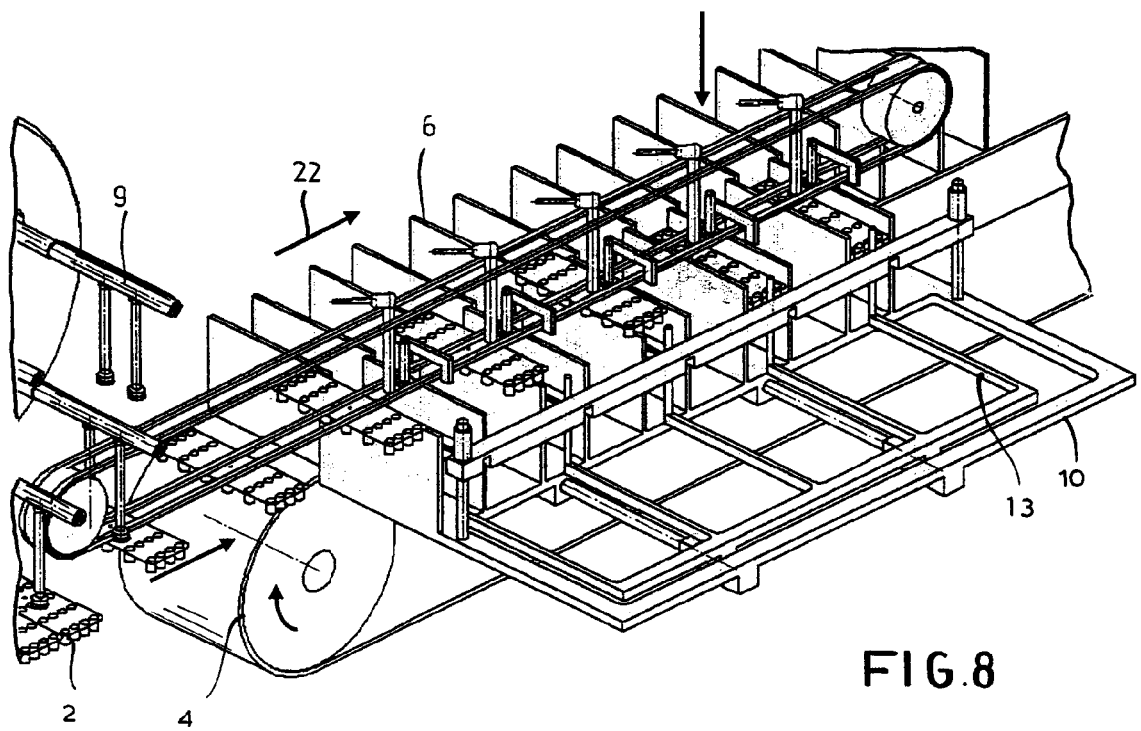
FIG. 8 is a view like FIG. 6 showing dropping of the first object in the second stack well.
Figure 9:
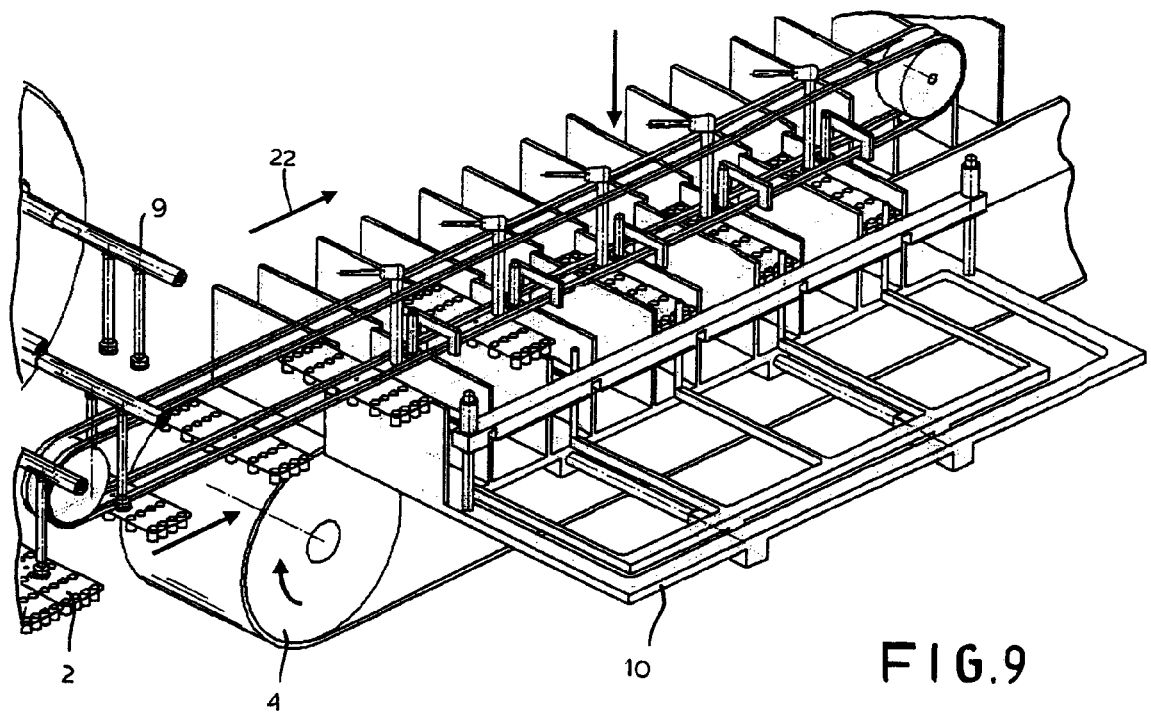
FIG. 9 is a view like FIG. 6 showing dropping of the first object in the third stack well.
Figure 10:
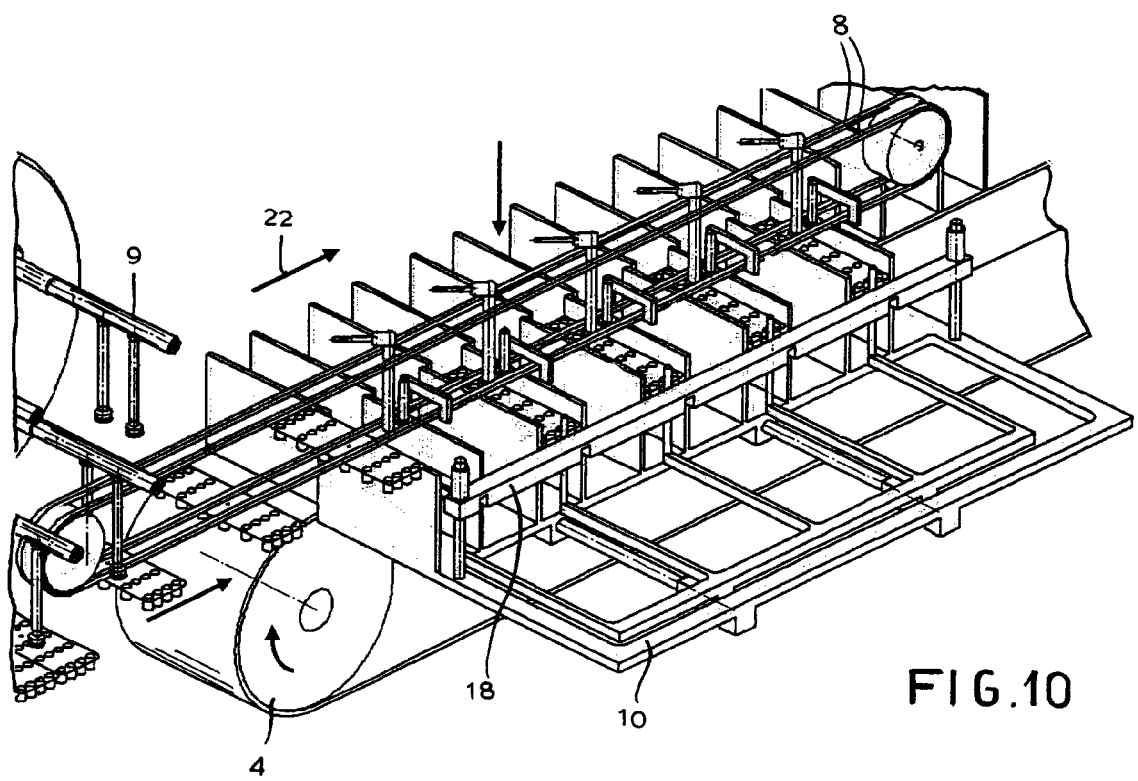
FIG. 10 is a view like FIG. 6 showing dropping of the first object in the fourth stack well.
Figure 11:
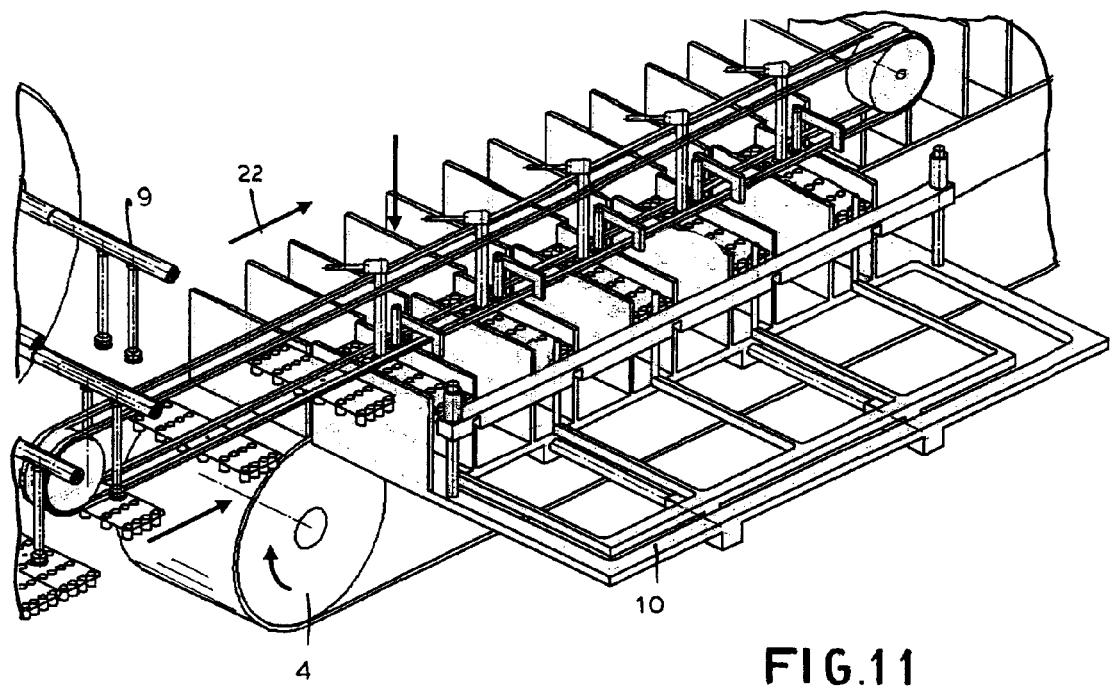
FIG. 11 is a view like FIG. 6 showing dropping of the first object in the fifth stack well.

At the start of a cycle, as soon as the furthest downstream object 2 is above the furthest downstream stack well 11, the respective abutment 15 is swung into place to stop it and prevent it from moving further downstream, as shown in FIG. 6. This action continues as shown in FIGS. 7 through 11 until there is one of the objects 2 suspended from the input device 7 above each of the wells 11 of the cassette 10.

Almost immediately after each object 2 is stopped by its respective abutment 15, the respective pusher rod 16 moves downward between the belts 18 to knock it off the input device 7, so that it falls down in the well 11. The objects 2 drop only through a very short distance to settle on the floor 25.

Figure 12:
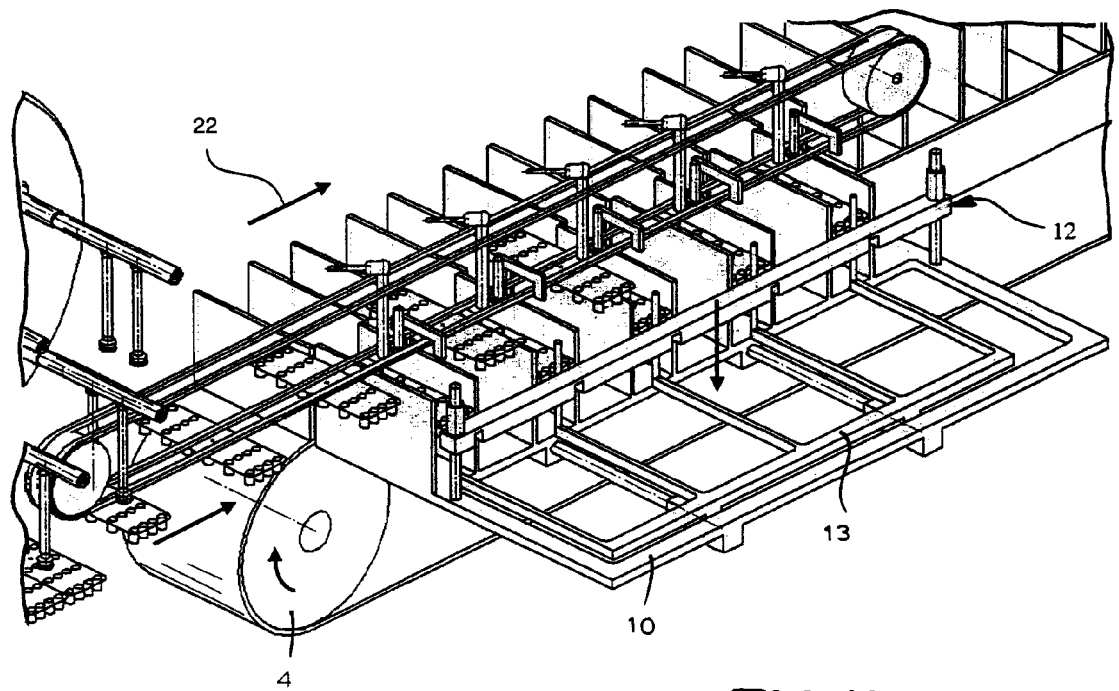
FIG. 12 is a view like FIG. 6 showing the lifter making a uniform drop distance for the second layer of objects in the object stacks.

Thereafter as shown in FIG. 12 the actuator 29 shifts all the floors 25 down by a distance equal to about the height of one of the objects 2. The steps of stopping five of the objects 2, dropping them into the respective wells 11, then stepping down the floors 25 of the wells 11 are then repeated until each well 11 holds a stack 3 with a predetermined number of the objects 2.

Figure 13:
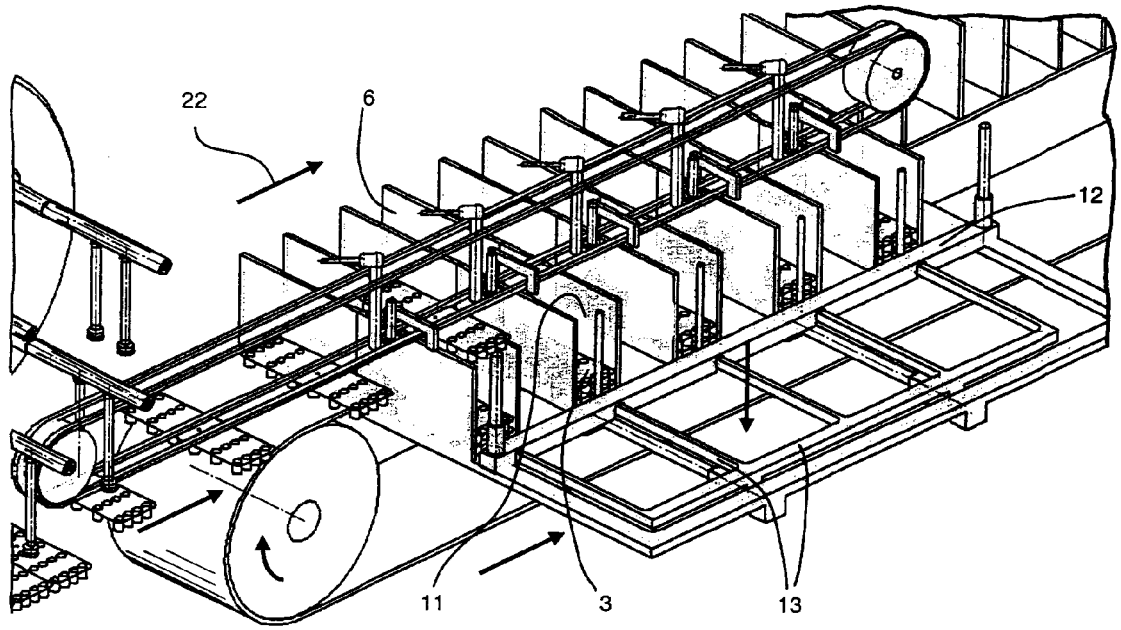
FIG. 13 is a view like FIG. 6 showing the lifter preparing transfer of the object stacks into the package conveyor.
Figure 14:
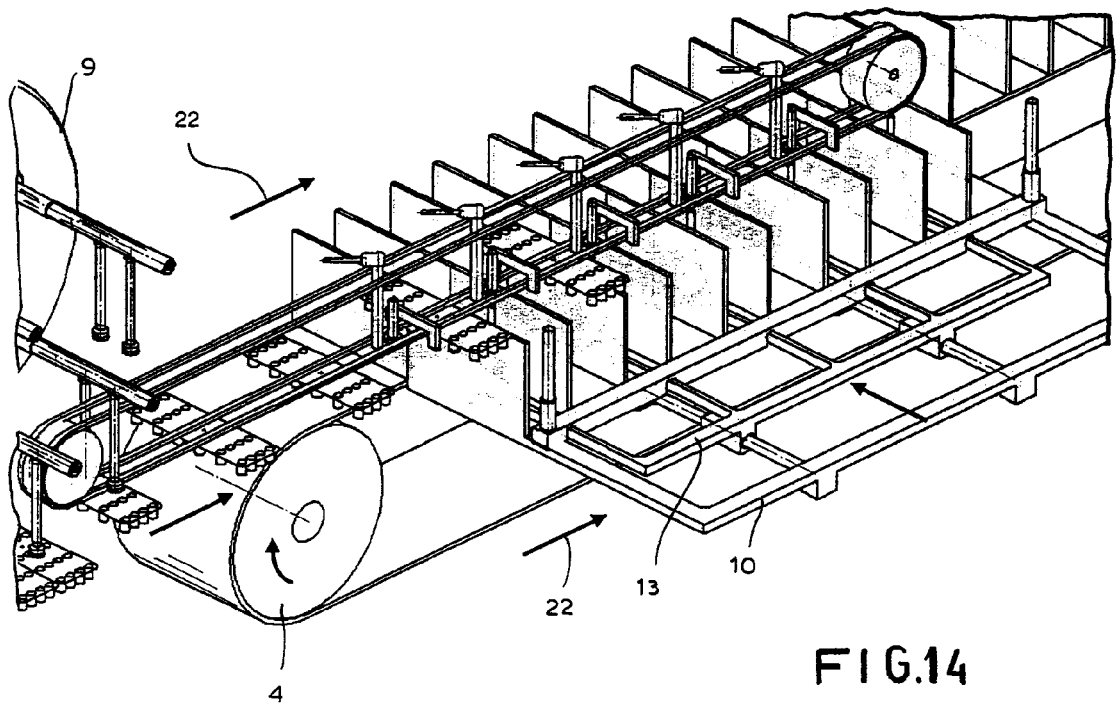
FIG. 14 is a view like FIG. 6 showing shifting of the cassette to synchronize with the package conveyor.
Figure 15:
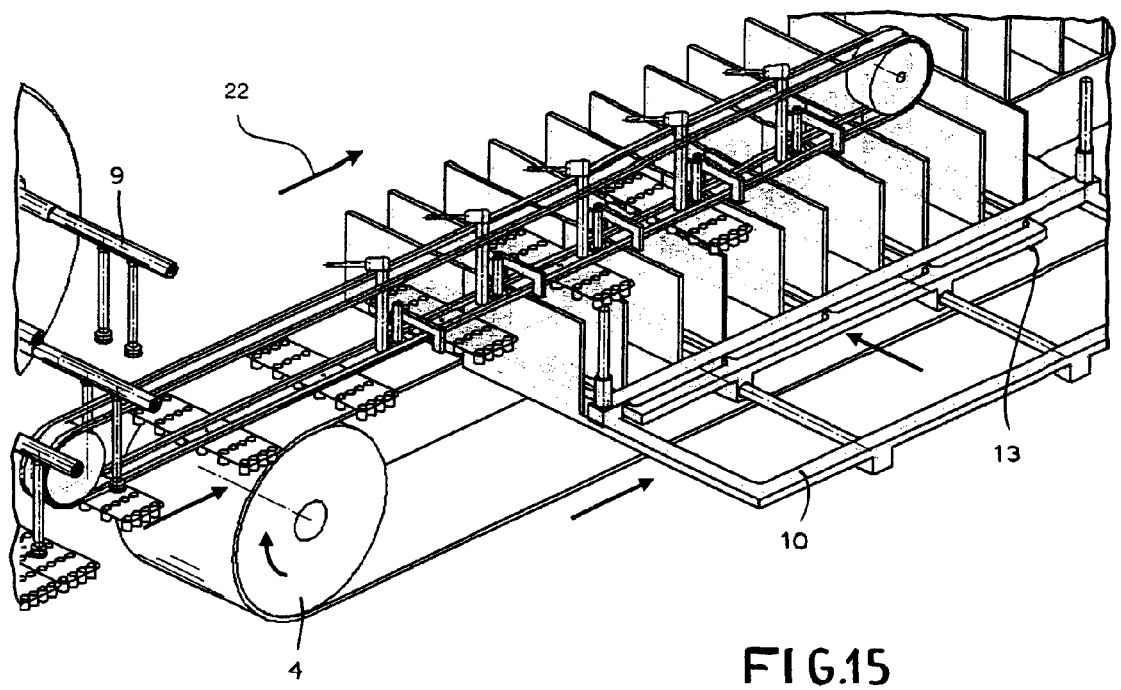
FIG. 15 is a view like FIG. 6 showing pushing of the object stacks into the package conveyor.

Then as shown in FIGS. 13, 14, and 15 the actuator 31 shifts the entire cassette 10 downstream in the direction 22 at a speed identical to that of the conveyor 4 and so as to align each of the wells 11 with a respective one of the cells 23. Then the pusher bars 19 are shifted by their actuator 28 so as to push the stacks 3 from the wells 11 into the cells 23.

Figure 16:
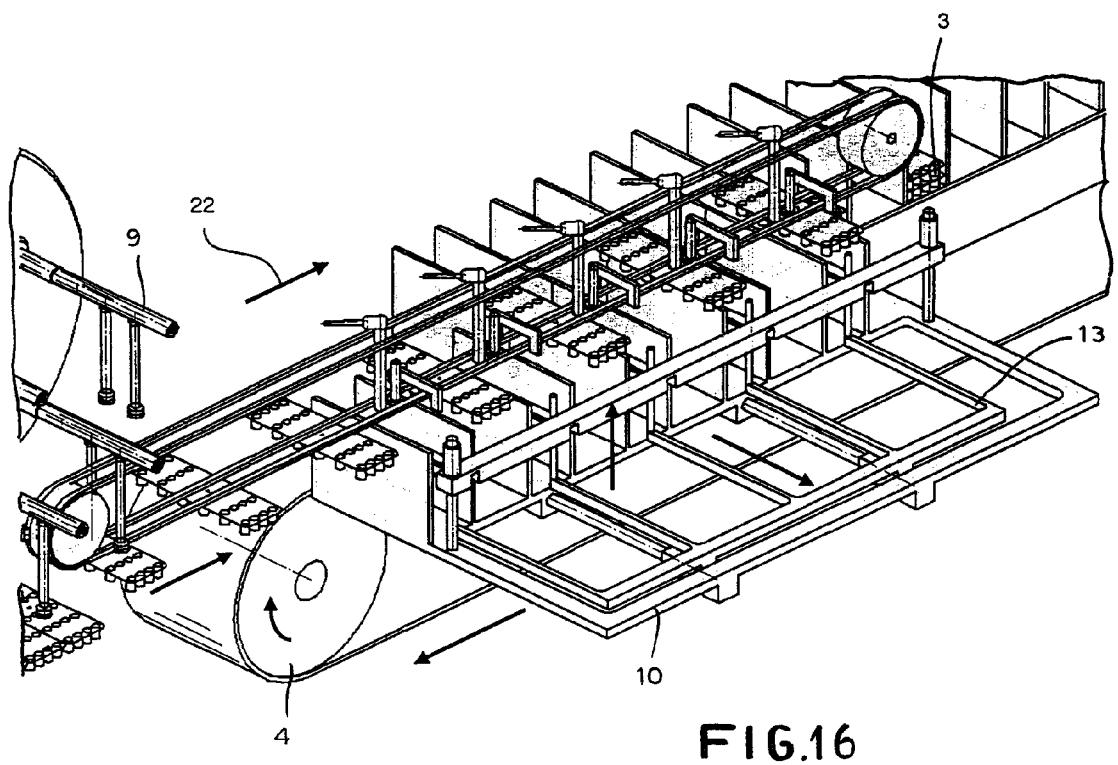
FIG. 16 is a view like FIG. 6 showing the package conveyor carrying off the object stacks during return of the cassette to the stack-forming position.

Finally the cassette 10 is shifted back upstream by its actuator 31 as shown by FIG. 16 to return to the stack-forming position in the station 24, and the entire cycle can start again. During this return movement the actuator 29 moves the floors 25 back up to their upper positions.

I claim:

1. A method of handling objects, the method comprising the steps of:
   a) continuously delivering the objects at a generally uniform rate, one at a time, and one after the other with a suction belt in a longitudinal transport direction to a transfer station;
   b) continuously displacing a conveyor extending longitudinally in the transport direction past and away from the transfer station in the direction at a generally constant transport speed, the conveyor having a row extending longitudinally in the direction of transversely open conveyor cells;
   c) arresting a cassette defining a row extending longitudinally in the direction of upwardly open stack wells shaped to receive the objects and having a common floor in the transfer station in an upstream stack-forming position underneath the suction belt while the suction belt delivers the objects to the transfer station;
   d) detecting objects in the station by a sensor at each of the stack wells and stopping a respective one of the objects above each of the stack wells of the arrested cassette by engagement with a respective abutment above each of the stack wells in accordance with an output of the respective sensor;

e) engaging each of the stopped objects with a respective vertically effective knockout tool to separate the stopped object from the belt in accordance with an output of the respective sensor and thereby dropping each of the stopped objects into the respective well of the arrested cassette, the knockout tools operating synchronously with the suction belt so that the objects are separated generally simultaneously from the suction belt by the respective knockout tools so they drop into the respective stack wells ;

f) lowering the floor of the cassette each time objects are dropped into the wells by a distance generally equal to a vertical height of one of the objects;

g) repeating steps d) through f) while the cassette is arrested in the upstream stack-forming position until there is a stack of a predetermined number of the objects in each of the wells; and h) thereafter displacing the cassette longitudinally downstream out of the upstream stack-forming position in the direction synchronously with the conveyor at the transport speed while simultaneously pushing all of the stacks of objects in the wells transversely of the direction out of the wells into the cells of the conveyor.

2. An object-handling system comprising:

a suction belt for delivering objects one at a time and one after the other to a transfer station in a longitudinal transport direction;

a conveyor extending longitudinally in a transport direction past and away from the transfer station and having a row of transversely open cells;

drive means for moving the conveyor longitudinally in the direction at a generally constant transport speed;

a cassette displaceable next to the conveyor in the transport direction from an upstream stacking position and having a row extending longitudinally in the direction of upwardly open stack wells shaped to receive the objects and having a common floor;

a sensor above each of the stack wells in the upstream stacking position producing an output on proximity of one of the objects;

an abutment above each of the stack wells in the upstream stacking position for, when the cassette is in the upstream stack-forming position underneath the suction belt, stopping one of the objects above each of the wells in accordance with the output of the sensor;

a vertically shiftable knockout tool above each of the stack wells in the upstream stacking position for knocking each of the stopped objects off the conveyor belt and into the well above which the respective object is stopped;

lifter means for lowering the floor of the cassette each time the objects are dropped into the respective wells by a distance generally equal to a vertical height of the object;

drive means for, when a stack of a predetermined number of the objects has been dropped by the suction belt into each of the wells, displacing the cassette out of the upstream stack-forming position downstream in the direction synchronously with the conveyor at the transport speed;

pusher means for simultaneously shifting all of the stacks of objects in the wells transversely of the direction out of the wells into the cells of the conveyor when the cassette is moving synchronously with the conveyor; and control means connected to the lifter, drive, and pusher means for synchronously operating same.

3. The object-handling system defined in claim 2 wherein the stack wells are spaced apart in the transport direction identically to the cells of the conveyor.

4. The object-handling system defined in claim 2 wherein the cassette has at each stack well a respective pair of generally parallel upright walls spaced apart in the transport direction and both extending generally perpendicular to the transport direction, the walls projecting upward from the common floor and defining the respective stack well.

5. An object-handling system comprising:

a suction belt for delivering objects one at a time and one after the other to a transfer station in a longitudinal transport direction;

a conveyor extending longitudinally in a transport direction past and away from the transfer station and having a row of transversely open cells;

drive means for moving the conveyor longitudinally in the direction at a generally constant transport speed;

a cassette displaceable next to the conveyor in the transport direction from an upstream stacking position and having a row extending longitudinally in the direction of upwardly open stack wells shaped to receive the objects and having a common floor, the cassette having at each stack well a respective pair of generally parallel upright walls spaced apart in the transport direction and both extending generally perpendicular to the transport direction, the walls projecting upward from the common floor and defining the respective stack well, the walls being adjustable on the cassette in the transport direction, whereby objects of different format can be stacked;

a sensor above each of the stack wells in the upstream stacking position producing an output on proximity of one of the objects;

an abutment above each of the stack wells in the upstream stacking position for, when the cassette is in the upstream stack-forming position underneath the suction belt, stopping one of the objects above each of the wells in accordance with the output of the sensor;

a vertically shiftable knockout tool above each of the stack wells in the upstream stacking position for knocking each of the stopped objects off the conveyor belt and into the well above which the respective object is stopped;

lifter means for lowering the floor of the cassette each time the objects are dropped into the respective wells by a distance generally equal to a vertical height of the object;

drive means for, when a stack of a predetermined number of the objects has been dropped by the suction belt into each of the wells, displacing the cassette out of the upstream stack-forming position downstream in the direction synchronously with the conveyor at the transport speed; and pusher means for simultaneously shifting all of the stacks of objects in the wells transversely of the direction out of the wells into the cells of the conveyor when the cassette is moving synchronously with the conveyor.

* * * * *